US011010702B1

(12) United States Patent
Shah et al.

(10) Patent No.: US 11,010,702 B1
(45) Date of Patent: May 18, 2021

(54) MODEL MANAGEMENT SYSTEM

(71) Applicant: Wells Fargo Bank, N.A., San Francisco, CA (US)

(72) Inventors: Tapan Shah, Charlotte, NC (US); Steve Cardinale, Charlotte, NC (US); Casey A. Bennett, Charlotte, NC (US); John V. Hintze, Charlotte, NC (US); Jason Hilliard, Charlotte, NC (US); Simon Cann, Charlotte, NC (US); Kevin D. Oden, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 418 days.

(21) Appl. No.: 15/068,245

(22) Filed: Mar. 11, 2016

Related U.S. Application Data

(60) Provisional application No. 62/268,543, filed on Dec. 17, 2015.

(51) Int. Cl.
*G06Q 10/06* (2012.01)

(52) U.S. Cl.
CPC ....... *G06Q 10/0635* (2013.01); *G06Q 10/067* (2013.01); *G06Q 10/06393* (2013.01)

(58) Field of Classification Search
USPC ...................................................... 705/7.28
See application file for complete search history.

(56) References Cited

U.S. PATENT DOCUMENTS

| | | | |
|---|---|---|---|
| 6,311,144 B1 | 10/2001 | Abu El Ata | |
| 7,716,592 B2 | 5/2010 | Tien et al. | |
| 7,769,684 B2 | 8/2010 | Del Bianco et al. | |
| 8,255,254 B2 | 8/2012 | Kumar et al. | |
| 8,260,653 B1 | 9/2012 | Osterfelt et al. | |
| 8,290,806 B2 | 10/2012 | Lee et al. | |
| 2007/0294118 A1* | 12/2007 | Tait | G06Q 10/0635 705/7.28 |
| 2010/0274596 A1 | 10/2010 | Grace et al. | |
| 2011/0093309 A1 | 4/2011 | Dayasindhu et al. | |

(Continued)

OTHER PUBLICATIONS

Green et al. (Market Risk and Model Risk for a Financial Institution Writing Options, The Journal of Finance, The Journal of the American Finance Association, Published Dec. 17, 2002, pp. 1465-1499).*

(Continued)

*Primary Examiner* — Matthew D Henry
(74) *Attorney, Agent, or Firm* — Merchant & Gould P.C.

(57) ABSTRACT

A model management system receives data for an inventory of models including data regarding issues for each of the models. The model management system determines a model risk score for each of the models based on the issues for each of the models. As the issues are opened and closed, the model management system receives updates and in real-time, updates the model risk score. The model risk score can be determined using a severity assigned to each issue for each of the open issues for a given model as well as the number of issues at each severity. Risk scores can be calculated across a line of business and across an enterprise, for example. The model management system also provides one or more of: model development, model validation, model integration, model use, model maintenance, and model retirement.

20 Claims, 7 Drawing Sheets

(56) References Cited

U.S. PATENT DOCUMENTS

| | | | |
|---|---|---|---|
| 2011/0106578 A1* | 5/2011 | Cerminaro | G06Q 10/0635 |
| | | | 705/7.28 |
| 2012/0053981 A1* | 3/2012 | Lipps | G06Q 10/0635 |
| | | | 705/7.28 |
| 2012/0203596 A1 | 8/2012 | Guthridge et al. | |
| 2012/0221371 A1 | 8/2012 | Hegazy et al. | |
| 2012/0278217 A1* | 11/2012 | Sui | G06Q 20/4016 |
| | | | 705/35 |
| 2014/0278733 A1 | 9/2014 | Sabharwal | |
| 2015/0227868 A1* | 8/2015 | Saraf | G06Q 10/0635 |
| | | | 705/7.28 |

OTHER PUBLICATIONS

Cornford et al., DDP—A Tool for life-cycle risk management, 2001 IEEE, 11pgs.

Sanchez et al., Measuring Portfolio Strategic Performance Using Key Performance Indicators, Project Management Journal vol. 41, No. 5, pp. 64-73, Dec. 2010, 10 pgs.

Scarlat et al., Indicators and Metrics Used in the Enterprise Risk Management (ERM), Economic Computation and Economic Cybernetics Studies and Research, vol. 46.4, pp. 5-18, 2012, 14pgs.

* cited by examiner

WELLS FARGO — MODEL RISK SYSTEM — CASEY BEMET ☒ HELP

DASHBOARD ▶ | INVENTORY | ISSUES | EXCEPTIONS | REPORTING ▶ | ADMIN ▶ | QTM SEARCH | SHAREPOINT

QTM INVENTORY

CREATE QTM | SELECT EXPORT TYPE ▶ | GENERATE REPORT | CUSTOMIZE GRID | GRID LAYOUT OPTIONS | +  | −

DRAG A COLUMN HEADER HERE TO GROUP BY THAT COLUMN

| # | QTM NUMBER | LOB | QTM NAME | SUB-LOB | SEGMENT NAME | HISTORICAL MODEL NUMBER | CFMO(S) | QTM |
|---|---|---|---|---|---|---|---|---|
|  | 10000 | CLG - CONSUMER UNSECURED CREDIT RISK (CUCR) | FINANCIAL CARD STANDARD AND COD VINTAGE SA MODELS | CONSUMER FINANCIAL SERVICES (CFS) | 4 SEGMENTS BASED ON PRODUCT TYPE AND FICO | CRD-1-139 | PHIL HADON | ACL/LOSS FORECASTING |
|  | 10001 | WHOLESALE BANKING | IRP-YIELD CURVE CALIBRATION MODEL | WFS (IRP) | NONE | WLS-2-501 | MARIE DODD | BASEL (PILLAR I), CCAR / MID C TESTING, PRICING, RISK ANALYSIS |
|  | 10002 | WHOLESALE BANKING | IRP-FXCASHWB PRICER | WFS (IRP) | N/A | WLS-1-535 |  | BASEL (PILLAR I), CCAR / MID C TESTING, PRICING, RISK ANALYSIS |
|  | 10003 | WHOLESALE BANKING | FX-FENICS AVERAGE RATE | F/X | NONE | WLS-1-410 | MARIE DODD, JOHN YAELLO | CCAR / MID CYCLE STRESS TE MANAGEMENT |
|  | 10004 | WHOLESALE BANKING | FX-FENICS BINOMIAL TREE LOG-NORMAL OPTION MODEL | F/X | NONE | WLS-3-401 | MARIE DODD, JOHN YAELLO | CCAR / MID CYCLE STRESS TE MANAGEMENT |
|  | 10005 | WHOLESALE BANKING | FX-FENICS CSIRO WINDOW BARRIER | F/X | NONE | WLS-2-409 | MARIE DODD, JOHN YAELLO | CCAR / MID CYCLE STRESS TE MANAGEMENT |
|  | 10006 | WHOLESALE BANKING | FX-FENICS VOLATILITY SURFACE AND EUROPEAN OPTIONS | F/X | NONE | WLS-2-407 | MARIE DODD, JOHN YAELLO | CCAR / MID CYCLE STRESS TE MANAGEMENT |

WELLS FARGO | | | | | Casey Bemet ☒ Help
---|---|---|---|---|---
| | | Model Risk System | | QTMSearch
Dashboard ▸ | Inventory | Issues | Exceptions | Reporting ▸ | Admin ▸ | Sharepoint

500

Deposit Attrition Model — Edit QTM

QTM LifeCycle Status: Canceled Pre-Implementation  LOB: CorporateFinance  Developer(s):
QTM Number: 11983  Sub-LOB: CorporateTreasury-ALM  Current Approval Status:
System Date: 11/2/2015  QTM Owner: Malina Nikova  Model Risk Score:
Version: 1.0

Launch QTM Approval | Launch QTM ID | Export QTM

| QTM Information | QTM History | Documentation | Issues | Exceptions | Risk Scores | Model Mandates | Performance Monitoring | Change Log | Projects | Artifacts |

Historical Model Number:  Economic Variables:
Validators(s):  CCAR/Mid-Cycle Stress Test Indicator: N/A
Monitoring Lead: ⊙  Vendor QTM: ☐
Model Risk Officer: Patrick Gervais  RABU: CORPORATE FINANCE - TREASURY/IPG
CMoR Performance Reviewer:  Risk Rank - Final Approval:
Segment Name:  Risk Rank Approval Date:

MODEL MANAGEMENT SYSTEM

BACKGROUND

Different types of enterprises employ one or more models to evaluate risk associated with various aspects of each enterprise's business dealings. Some types of businesses, such as financial institutions, health care organizations, and insurance institutions, are subject to governmental regulations. In those instances, government regulators periodically evaluate the risk positions to ensure compliance with regulatory law. Depending on the size of the enterprise, tens, hundreds or thousands of models may be simultaneously in use.

SUMMARY

Embodiments of the disclosure are directed to a model management system that can be implemented on an electronic computing device. In one aspect, an electronic computing device includes a processing unit and system memory, system memory including instructions that, when executed by the processing unit, cause the electronic computing device to receive data for an inventory of models including data regarding issues for each of the models, determine a model risk score for each of the models based on the issues for each of the models, receive an update as the issues are opened and closed, and update the model risk score after receiving the update.

In another aspect, a model management system includes an electronic computing device including a processing unit and system memory. The system memory includes instructions that, when executed by the processing unit, cause the electronic computing device to provide a model risk home page, populate the model risk home page with data regarding a plurality of models, receive an input selecting one of the plurality of models, receive a plurality of model risk score inputs including issues for the model, generate a model risk score based on the issues for the model, receive an update to one of the plurality of model risk score inputs, and generate an updated model risk score based on the update to one of the plurality of model risk score inputs.

In yet another aspect, a system for managing models includes a computer-readable, non-transitory data storage memory comprising instructions that, when executed by a processing unit of an electronic computing device, cause the processing unit to receive data for an inventory of models including a model itself, a list of stakeholders for the model, a model history, and a document related to the model and data regarding issues for each of the models; determine a model risk score for each of the models based on the issues for each of the models; receive an update as the issues are opened and closed, and update the model risk score after receiving the update. The data regarding issues for each of the models also includes a severity assigned to each issue, a designation of each issue as open or closed, and where the model risk score is based on the severity assigned to each open issue and the number of issues at each severity.

The details of one or more embodiments are set forth in the accompanying drawings and the description below. Other features, objects, and advantages of these embodiments will be apparent from the description, drawings, and claims.

DESCRIPTION OF THE DRAWINGS

The following drawing figures, which form a part of this application, are illustrative of described technology and are not meant to limit the scope of the disclosure as claimed in any manner, which scope shall be based on the claims appended hereto.

FIG. 4 is an embodiment of an example home page for the model management system of FIG. 1.

FIG. 5 is an embodiment of an example model home page for the model management system of FIG. 1.

DETAILED DESCRIPTION

Broadly, the present disclosure is directed to a centralized system for tracking and managing issues and exceptions for models, recording documentation associated with models, tracking and managing validation, and/or evaluating performance of models. The systems can provide a holistic view of risks associated with each of the models, as well as a holistic view of risks for all or a subset of the models.

A model is a quantitative mathematical or statistical construct used to simulate a complex view of real world events. One example of such a model is sometimes referred to as a quantitative tool and methodology (QTM). For example, a model may be constructed to predict credit losses in order to estimate exposure to credit risk based on existing or prospective extensions of credit. A model may also be used to simulate various economic scenarios to determine sufficiency of capital reserves. A financial institution may have a significant inventory of models and may need to track and manage risks associated with each model either individually or holistically. The risks may include, for example, risks associated with the ability of the model to perform its intended functions.

One aspect of the present disclosure centralizes and standardizes each model risk score across an entire enterprise. Another aspect provides insight into the necessary steps and current progress of model validation, sometimes known as validation pipeline management. Because models change and require validation and reviews, stakeholders and/or regulators may need to understand holistically what is being requested and when, and understand those aspects across the entire business line or model use type. The present disclosure provides a system enabling clear pipeline visibility about which models need to be reviewed and when, and provides that visibility across the entire enterprise.

Another aspect of the present disclosure provides efficient proof of the credibility challenges to models used across the enterprise. An additional aspect of the present disclosure defines a model classification process and a risk ranking qualification process. Yet another aspect of the present disclosure includes storing all documentation related to the models with the models in a centrally-accessible location.

Centralizing the aforementioned functionalities in a model management system improves, for example, the transactional efficiency of an enterprise's computers, saves memory usage, and reduces the quantity of computations performed by the enterprise's computers.

Figure 1:
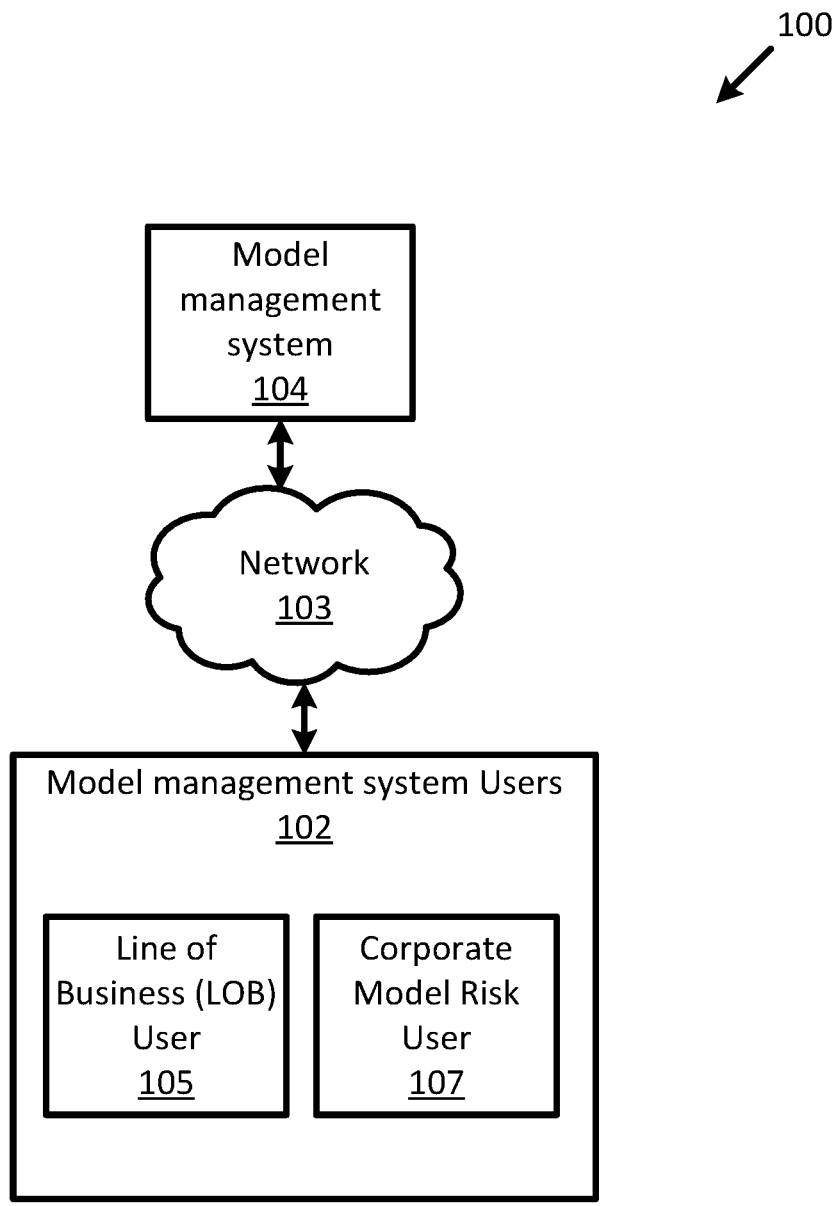
FIG. 1 is an embodiment of an example environment in which a model management system is implemented.

FIG. 1 illustrates a schematic diagram of an embodiment of an example environment 100 in which a model management system 104 is implemented. In the embodiments described herein, the model management system 104 tracks and manages issues for models, manages documentation associated with models, tracks and manages model validation, and evaluates the performance of models.

The environment 100 includes model management system users 102 that interact with the model management system 104 via a network 103. Network 103 can be any type of network, including a local area network (LAN), a wide area network (WAN), or the Internet. In this embodiment, the model management system users include a line of business (LOB) user 105 and a corporate model risk user 107. Other embodiment can include more or fewer components and different types of users.

Generally, the model management system 104 enables the generation, use, maintenance, and modification of models and model risk scores. Further, the model management system 104 can provide alerts to the LOB user 105 and/or the corporate model risk user 107 and produce documents related to regulatory compliance. These functions are described in more detail at least with reference to FIGS. 2-6 below.

Figure 2:
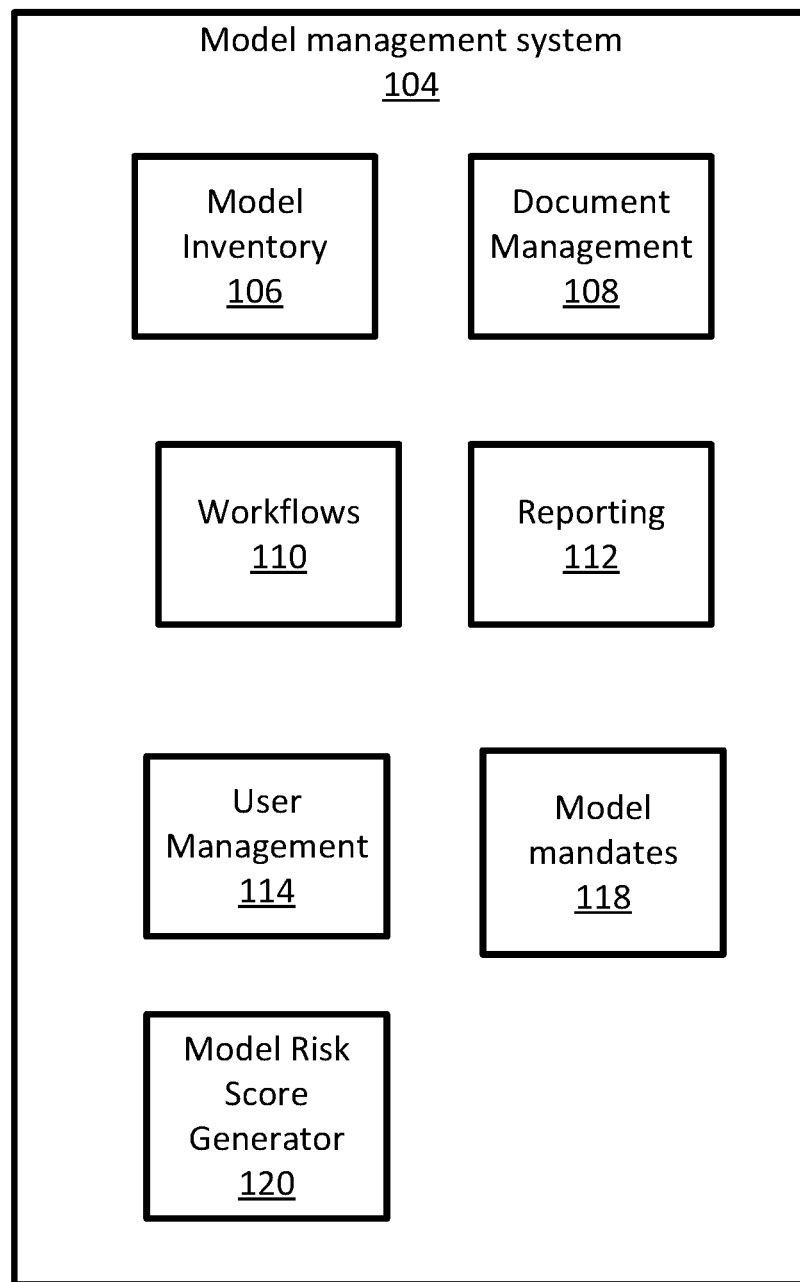
FIG. 2 is a schematic diagram of components included in the embodiment of example model management system shown in FIG. 1.

FIG. 2 is a schematic diagram of components included in the embodiment of example model management system 104. The schematic diagram shows the model management system 104 including a model inventory 106, document management 108, workflows 110, reporting 112, user management 114, model mandates 118, and model risk score generator 120. Other embodiments can include more or fewer components.

Model management system 104 includes a model inventory 106 stored in one or more databases. The model inventory 106 includes all active and retired models, all information and documents/documentation relating to the model. Examples of information related to a model include: model number, model name, implementation date, last revision date, retirement/active status including relevant dates, owner identification, QTM uses, risk score, risk rank, version, performance status, author, creation date, modifications and users who modified the model, LOB, and others.

Model management system 104 includes document management 108. Document management 108 enables the storage of documents related to a model in a centralized location so that a model management system user 102 can access documents related to a model without navigating away from the model management system 104. That is, a model management system user 102 does not need to search other systems or share point sites in the enterprise to locate all documents associated with the model. Rather, the model management system user 102 can view and open the model documents from within the model management system 104.

Model management system 104 also includes workflows 110 that include one or more successive and/or parallel steps performed by enterprise personnel and/or the model management system 104. For example, the model management system 104 automates a model generation workflow (e.g., creating a new model and entering information relevant to the new model), a model approval workflow (e.g., facilitating review and approval of the model by multiple users across the enterprise that can be in different business groups), a validation issues tracking workflow (e.g., facilitating the review, tracking, and correction of any identified validation issues of the model), an LOB evaluation issues tracking workflow (e.g., facilitating the review, tracking and correction of issues specific to the line of business evaluation of a model), and an exceptions/conditions/restrictions tracking workflow (e.g., facilitating the entry of, and proper notification to relevant personnel about, exceptions, conditions, or restrictions relevant to a model). Automation includes guiding the users through the relevant processes, notifying other users about the progress of the workflow and whether their input is required, and storing and organizing all data and documents.

Model management system 104 also includes reporting 112 functionalities. For example, model management system 104 can produce canned reports, dashboard, and ad-hoc query capabilities. Model management system 104 supports compliance reporting, which includes preparing and producing reports for production to government regulation-compliance personnel. Model management system 104 also supports producing reports designed for internal use, such as reports showing an overview of the risk status of one or more models.

Reporting 112 includes performance monitoring. For example, the model management system 104 can store, create, and display performance-related information such as key performance indicators (KPI), risks such as data risk, implementation risk, use risk, and performance risk, and monitoring program stakeholder data. That is, the model management system 104 can group all monitoring programs and performance reviews associated with the QTM in the model view displayed by the model management system 104.

Performance monitoring can also include producing a performance rating. Producing the performance rating can involve, for example, receiving a list of KPIs for a model, testing the model against the KPIs, and providing a visual indication (e.g., green, yellow or red) of the performance of the model in addition to the model risk score. Generally, the green, yellow, and green visual indications correspond to continue, watch, or action required. When the rating is "action required," an issue is created.

Reporting also includes real-time issue and severity trackers. In embodiments, one or more stakeholders are notified when something in the model management system 104 changes that affects an issue or a model risk score. When a user runs a report, such as viewing information related to a model's history or model risk score, the information is real-time. That is, for every live model in the model management system 104 that meets the report criteria, the data displayed to the user are current. Thus, a user does not need to track down documents or perform calculations to ensure the data in the report are accurate and up-to-date.

Some models in the model management system 104 can be in a suspended state. As part of one or more workflows, various stakeholders work with the model before it is published and released as a live model in the model management system 104. Each stakeholder can work on a model simultaneously and the model can be edited or modified. This is in contrast to previously-existing applications where each stakeholder would take turns doing their part of the model validation and once their work was entered, it could not be changed.

The model management system 104 enables a user, such as a validator, to start a validation activity and start a project. The user can upload documents to the model management system 104, create a report, identify issues, complete a model mandate, complete a model risk score, etc. Other stakeholders, such as a line of business owner, can go into the model in the model management system 104, discuss the model and review the model and associated documents. However, if a report was run in the model management system 104, the model is not available. Only published or finished models are available. This can be desirable because if the model is not finished, then the model should not have its model risk score included in reports or affect risk appetite. When the stakeholders agree that the work is finished, then the validator publishes the model and it is released into the model management system 104. Further, the model's issues and risk score are real-time and available.

Reporting 112 also includes a model risk rank generator. The model risk rank generator generates a model risk score report categorized by risk rank, for example, risk rank 1, risk rank 2, risk rank 3, and/or risk rank 4 QTMs. The model risk rank generator can export the model risk score report as a spreadsheet, word processing file, portable document format, etc.

Model management system 104 also provides user management 114 functionalities. Each LOB user 105 and corporate model risk user 107 accesses the model management system 104 through a web browser. Access to the model management system 104 can be limited to the use of the HTTPS protocol or a similarly secure portal, and can be limited to an intranet or open to Internet access. Model management system 104 restricts the levels of authority and provides different access permissions for the LOB users 105 and corporate model risk users 107.

Model management system 104 also includes model mandates 118. Generally, a model mandate 118 represents a distillation of information and analysis created through model development, validation, monitoring, and governance activities. A given model mandate 118 summarizes governance parameters applicable to a given model, which can include approved uses, identified issues, key individuals, monitoring metrics, and explicit limitations placed on the use of the model.

Model management system 104 presents model mandate 118 information in a concise, consistent and transparent format, which facilitates use by stakeholders across the enterprise. For example, the model management system 104 can provide information such as mandate creation date, reference number, validation activity (e.g., validation, revalidation, annual review), summary of model purpose, approved QTM uses, upstream and downstream models, limitations, restrictions, issues, model mandate completion date, model mandate completion author, comments, and links to an exportable report.

The embodiment of example model management system 104 authenticates model management system users 102 against a corporate active directory. Authorization is performed via role, grants, privileges, profiles, and resource limitations.

Model management system 104 includes an application that utilizes the model-view-controller architectural pattern to separate the different aspects of the model management system 104. Generally, a model-view-controller architectural pattern is used in graphical user interfaces to isolate the data representation (model) from what the user sees (view) and provide a way for the user to manipulate the data representation (controller). For example, the different aspects can include an input logic, a business logic, and a user-interface logic. This separation can help manage complexity and loose coupling can promote parallel development.

Model management system 104 also includes a model risk score generator 120. The model risk score generator 120 is used to generate a model risk score. Generally, the model risk score is an analytical method for measuring model risk. It is based on the severity and number of issues identified during the model validation process or performance monitoring review. Each issue identified as part of the model validation has a risk score assigned to it, where the risk score maps to the issue severity. An example implementation of the model risk score generator 120 is shown and described below with reference to FIG. 3.

A given model can have multiple uses. For example, the model can be used in different LOBs. In those instances then, the model can have different model risk scores and model risk ranks depending for each of the more than one uses.

Figure 3:
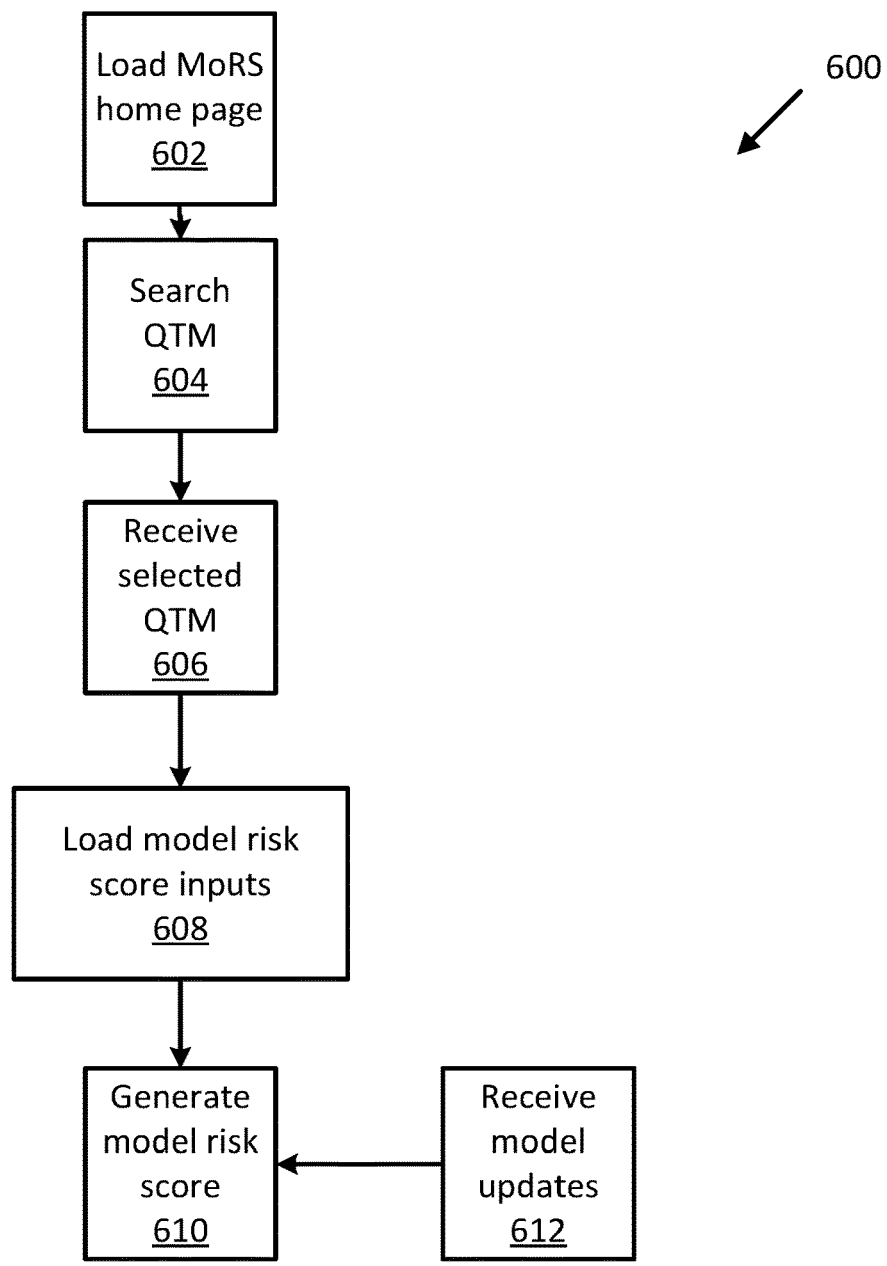
FIG. 3 is an embodiment of an example method of implementing the model risk score generator using the model management system of FIG. 1.

FIG. 3 illustrates an example method 600 of implementing the model risk score generator 120 using the model management system 104. The example method 600 includes loading model management system home page (operation 602), searching QTMs (operation 604), receiving selected QTMs (operation 606), loading model risk score inputs (operation 608), generating a model risk score (operation 610), and receiving model updates (operation 612). Other embodiments can include more or fewer operations.

The example method 600 begins when the model management system 104 loads the model management system home page (operation 602). In some embodiments, the model management system 104 loads within an internet browser, such as Internet Explorer or Microsoft Edge, both by Microsoft®, running on a user's computing device. Loading the home page (operation 602) can be in response to a user initializing an executable file stored locally or by a user entering an address into a web browser's address tool.

An embodiment of an example model management system 104 home page 400 is shown in FIG. 4. The embodiment of home page 400 includes main navigation buttons, such as a dashboard, inventory, issues, exceptions, reporting, administrator, and SharePoint. The dashboard page displays information relevant to the particular user. The inventory, issues, and exceptions pages display a sortable list of all active QTMs, issues, and exceptions, respectively, in the model management system 104. The reporting page provides a list of options for types of reports to export and formats, such as spreadsheet, canned reports, etc. The administrator page displays, for qualified users, a list of applicable administrative options. The SharePoint button navigates to a relevant SharePoint website. Also included in the home page is a QTM search, which enables a user to search for a QTM from any location in the model management system 104.

After the model management system home page is loaded (operation 602), the model management system 104 next searches for quantitative tool and methodology files (QTMs) (operation 604) and populates a sortable list of QTMs. This searching can be user-initiated or automatically accomplished upon loading of the home page. Alternatively, a user can instruct the model management system 104 to create a new QTM, populate the required fields, and then continue with the example method 600.

Upon selection by a user, the model management system next loads a QTM (operation 606) and displays information associated with the QTM on a QTM home page. An embodiment of an example QTM home page 500 is shown in FIG. 5. The embodiment of QTM home page 500 includes information associated with the QTM, for example, a QTM number, a QTM name, a QTM lifecycle status, a line of business, a sub-line of business, QTM uses, a risk rank, a model risk officer, a QTM owner, one or more developers, creation, edit and review dates.

The QTM home page also includes navigational buttons that cause the model management system 104 to display a QTM history, a list of documents with links to the actual documents, issues associated with the QTM, exceptions associated with the QTM, risk scores for the QTM, model mandates, performance monitoring, and projects.

When the QTM is loaded (operation 606) and a user selects a model risk score link, such as a tab shown in the interface, the model management system 104 loads model risk score inputs (operation 608). The model management system 104 can retrieve information used as inputs into the model risk score generation. Additionally, the model management system 104 can prompt the user for input, such as risk score adjustments to one or more categories and/or to the overall model risk score.

When the inputs are known, then the model management system 104 generates a model risk score (operation 610). The model risk score generator 120 calculates a model risk score using the formula I below:

model risk score ($K$)=model risk base ($A$)+model risk increment ($B$)+model risk adjustment ($C$)   (Equation I)

The use of formula I will be illustrated with an example calculation of a model risk score for an issue in a model and for the overall model.

Example 1—Calculation of a Category Risk Score

The calculation of a category risk score uses a similar formula to formula I:

$$\text{Score}(I_C) = \max_{i \in I}(score_i) + \min\left(u * \left[\frac{\text{sum}_{i \in I_C}(score_i)}{\max_{i \in I_C}(score_i)} - 1\right], 0.9\right) + a_C \quad \text{(Equation II)}$$

This is alternatively expressed as category risk score ($R$)=category base ($X$)+category increment ($Y$)+category adjustment ($Z$).

Each model risk score is based on the calculation of one or more category risk scores. In turn, the category risk scores are based on the issues associated with a category, where each model validation issue is assigned to an issue category. Generally, an issue is something that may impact the conceptual soundness of the model. Example issues include, for instance, an absence of consideration of certain data relevant to the model and a misapplication of an equation or formula. Other issues could surround the assumptions upon which a model is based if, for example, those assumptions change or are provide in accurate. Example categories include development data and inputs, conceptual soundness, implementation, ongoing monitoring and outcomes analysis, developmental evidence (such as documentation issues), governance and procedures, and usage.

Each model validation issue is assigned a severity which in turn is assigned a value. For example, the following Table 1 can be used to assign a value after determining the issue severity:

TABLE 1

| Issue Severity | Value |
|---|---|
| 0 | 4 |
| 1 | 3 |

TABLE 1-continued

| Issue Severity | Value |
|---|---|
| 2 | 2 |
| 3 | 1 |

The category risk score calculation begins by determining the category base (X), where:

category base ($X$)=$\max_{i \in I}$(score$_i$)   (Equation III)

Effectively, the category base (X) determination ensures that the risk score for the set of issues in a category is not lower than the highest score (value) in the set. Thus, the first issue severity to contain an issue will be the category base (X). An example determination of category base (X) follows.

For a particular category, seven issues have been identified: 3 "issue severity 0" issues, 1 "issue severity 1" issue, 2 "issue severity 2" issues, and 1 "issue severity 3" issues. The category base (x) formula determines the maximum value of all those issues. Therefore, for this example, category base (x)=4.

Next, a category increment (Y) is determined, where:

$$\text{Category Increment}(Y) = \text{Min}\left(u * \left[\frac{\text{sum}_{i \in I}(score_i)}{\max_{i \in I}(score_i)} - 1\right], 0.9\right) \quad \text{(Equation IV)}$$

The category increment (Y) is a number between [0, 1) which penalizes the models with a high number of issues, taking into account the severity of the issues. The category increment is calculated by first assigning a value to each issue severity count that acts as a multiplier to the number of issues at each issue severity level. In this example, the value of parameter u is set to u=0.1.

Continuing with the example, above, the Values in Table 2 are used as the multiplier:

TABLE 2

| Issue Severity | # of Issues | Multiplier (Value) | Multiple |
|---|---|---|---|
| 0 | 3 | 4 | 12 |
| 1 | 1 | 3 | 3 |
| 2 | 2 | 2 | 4 |
| 3 | 1 | 1 | 1 |
| | | Total: | 20 |

The Multiple column shows the number of issues at a given issue severity multiplied by the value. Then the Total is the sum of the multiples at each issue severity. Here, the sum total of the multiples is 20. In terms of Formula (IV), 20 is sum$_{i \in I}$ (score$_i$) and 4 is max$_{i \in I}$ (score$_i$). Substitution of all known parameters, followed by mathematical simplification, yields:

$$\text{Category Increment}(Y) = \text{Min}\left(0.1 * \left[\frac{20}{4} - 1\right], 0.9\right) \quad (1)$$

Category Increment ($Y$)=Min(0.1*[5−1],0.9)   (2)

Category Increment ($Y$)=Min(0.1*4,0.9)   (3)

Category Increment ($Y$)=Min(0.4,0.9)   (3)

Category Increment ($Y$)=0.4   (4)

The category manual adjustment (Z) is an optional manual adjustment. In some models, a manual adjustment is needed to address the risks not directly captured by the issues. Generally, the manual adjustment reflects the holistic view of the model by observing inherent risks and mitigating factors. The category manual adjustment (Z) is limited numerically such that the risk score after adjustment is not outside of the range [0, 5).

Continuing the example, a manual adjustment of 0 is assigned to this category. Thus, the category risk score (R)=4+0.4+0=4.4. The calculation of the category risk score (R) is performed for each Issue Category.

Example 2—Calculating a Total Model Risk Score

Example 1 provided an example calculation of one category risk score. Many models will include more than one category. In those instances, a single category risk score would not describe the overall model risk score. Example 2 builds off of the category risk score described in Example 1. Here, the model risk score has been calculated for seven categories, shown below in Table 3.

TABLE 3

| | Model Risk Scoring Input | | | | | Model Risk Scoring Output | | | |
|---|---|---|---|---|---|---|---|---|---|
| | Issue Count by Category and Severity | | | | | Model Risk | Additive Components | | |
| Category | 0 | 1 | 2 | 3 | Total | Score | Base | Increment | Adjustment |
| Development Data and Inputs | 0 | 0 | 0 | 0 | 0 | 0.0 | 0.0 | 0.0 | 0.0 |
| Conceptual Soundness | 0 | 0 | 2 | 4 | 6 | 2.3 | 2.0 | 0.3 | 0.0 |
| Implementation | 0 | 0 | 0 | 1 | 1 | 1.0 | 1.0 | 0.0 | 0.0 |
| Ongoing Monitoring and Outcomes Analysis | 0 | 0 | 1 | 5 | 6 | 2.3 | 2.0 | 0.3 | 0.0 |
| Developmental Evidence (Documentation issues) | 0 | 0 | 0 | 1 | 1 | 1.0 | 1.0 | 0.0 | 0.0 |
| Governance and Procedures | 0 | 0 | 1 | 4 | 5 | 2.2 | 2.0 | 0.2 | 0.0 |
| Usage | 0 | 0 | 0 | 0 | 0 | 0.0 | 0.0 | 0.0 | 0.0 |

The following formula (V) is used to calculate the overall model risk score:

$$\text{Score}(I) = \max_{i \in I}(score_i) + \min\left(u * \left[\frac{\text{sum}_{i \in I}(score_i)}{\max_{i \in I}(score_i)} - 1\right], 0.9\right) + a \quad \text{(Equation V)}$$

which can be also written as model risk score (K)=model risk base (A)+model risk increment (B)+model risk adjustment (C).

First the number of issues at each issue severity is summed. Thus, for this example model, there are 0 "issue severity 0" issues, 0 "issue severity 1" issues, 4 "issue severity 2" issues, and 15 "issue severity 3" issues. These summations are used in the calculation of formula (V).

The model risk base (A) calculation uses the Table 1 values from Example 1 above. The max score for model risk base (A) is the highest Value from Table 1. In this example, there are no "issue severity 0" issues and no "issue severity 1" issues, only "issue severity 2" and "issue severity 3" issues. Thus, the highest value of all issue severities is 2 and model risk base (A)=2.

Next, the model increment (B) is calculated using formula (VI) below:

$$\text{model increment}(B) = \text{Min}\left(0.1 * \left[\frac{\text{sum}_{i \in I}(score_i)}{\max_{i \in I}(score_i)} - 1\right], 0.9\right) \quad \text{(Equation VI)}$$

The $\text{sum}_{i \in I}(score_i)$ term is calculated by multiplying the number of issues at each issue severity by the multiplier, and then summing those multiples. This is shown below in Table 4.

TABLE 4

| Issue Severity | # of Issues | Multiplier | Multiple |
|---|---|---|---|
| 0 | 0 | 4 | 0 |
| 1 | 0 | 3 | 0 |
| 2 | 4 | 2 | 8 |
| 3 | 15 | 1 | 15 |
| | | Total: | 23 |

Thus, the $\text{sum}_{i \in I}(score_i)$ is 23. As noted above, the max score is 2. Thus, substituting all known values into equation (VI) and simplifying yields:

$$\text{model risk score increment}(B) = \text{Min}\left(0.1 * \left[\frac{23}{2} - 1\right], 0.9\right) \quad (1)$$

$$\text{model risk score increment}(B) = \text{Min}(0.1*[11.5-1], 0.9) \quad (2)$$

$$\text{model risk score increment}(B) = \text{Min}(0.1*10.5, 0.9) \quad (3)$$

$$\text{model risk score increment}(B) = \text{Min}(1.05, 0.9) \quad (4)$$

$$\text{model risk score increment}(B) = 0.9$$

Therefore, the model risk score increment (B) is 0.9.

A manual adjustment is needed in some circumstances to address risks not directly captured by the issues. As noted above in Example 1, generally, the manual adjustment reflects the holistic view of the model by observing inherent risks and mitigating factors. The category manual adjustment (Z) is limited numerically such that the risk score after adjustment is not outside of the range [0, 5).

In this example, the model risk score manual adjustment (Z) is set to −0.1.

Now all components of the model risk score calculation are known. The model risk score (R)=2+0.9+−0.1=2.8.

Then the model management system 104 performs one or more error checks. For example, the model management system 104 ensures that: the risk score for the set of issues is not lower than the highest score in the set; the model risk score increment is not outside [0, 0.9); the manual adjustment for an issue category cannot change the model risk score to be outside the range of [0, 5); the risk score calculation goes to one decimal place.

If the model risk score increment is less than 0, then the model management system 104 sets the model risk score increment equal to 0. If the model risk score increment is greater than 0.9, then the model management system 104 sets the model risk score increment equal to 0.9. If the model risk score is outside the range of [0, 5), then the model management system 104 prompts a warning to the user that the model risk score exceeds the boundaries of the model risk score. In that instance, the user can readjust the model risk score adjustment (Z) and proceed with the creation of a model risk score.

The model management system 104 also receives model updates (operation 612) after the model risk score is generated (operation 610). During the model's life, issues for a particular model are opened and/or closed in the model management system 104. As the model management system 104 receives updates, new model risk scores are generated (operation 610) in real-time.

Figure 6:
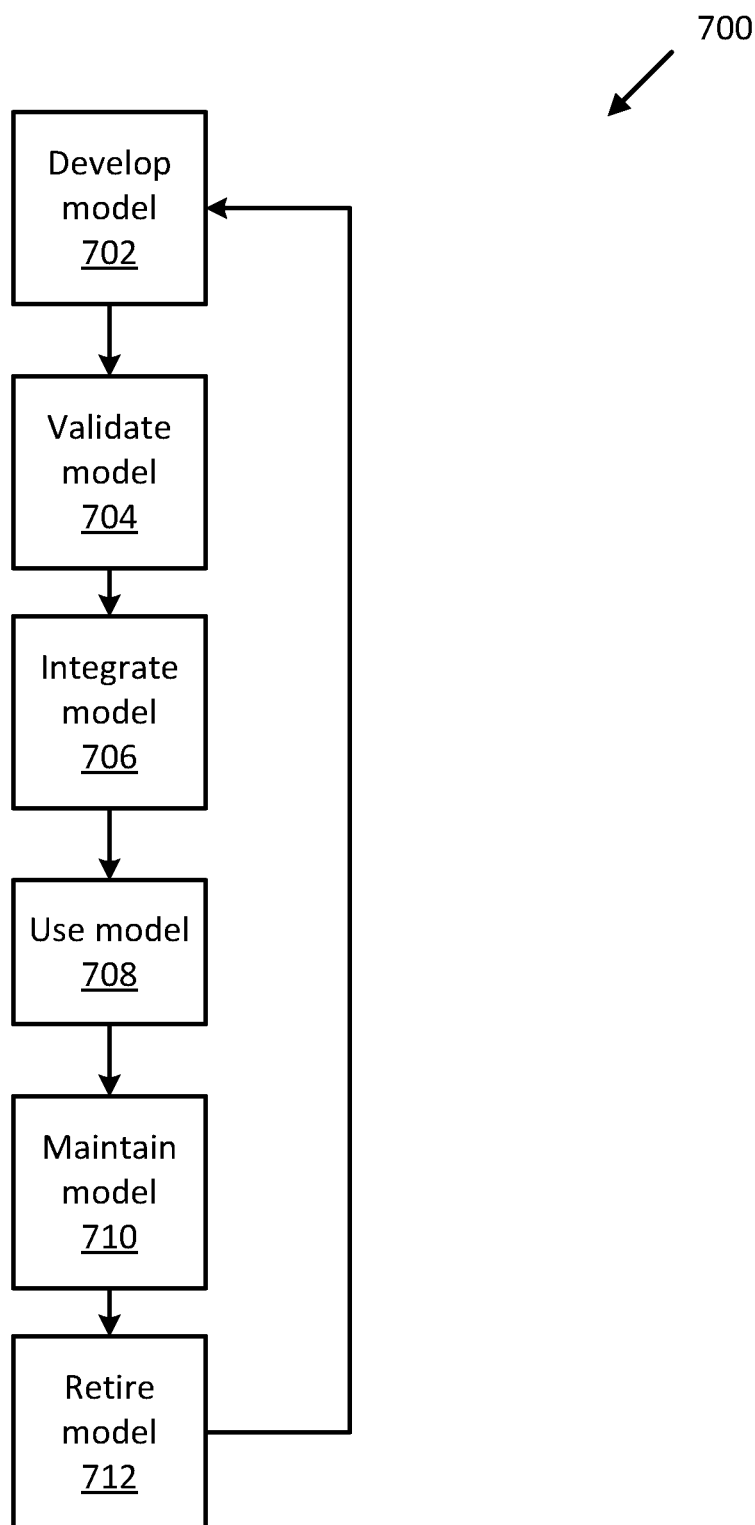
FIG. 6 is an embodiment of an example model life cycle in the model management system of FIG. 1.

FIG. 6 illustrates an embodiment of an example model life cycle 700 supported by the model management system 104. The example model life cycle 700 includes developing a model (operation 702), validating a model (operation 704), implementing a model (operation 706), using a model (operation 708), maintaining a model (operation 710), and retiring a model (operation 712). The example model life cycle 700 begins once a model has been identified. Examples of project roles that are stakeholders during the various operations of example model life cycle 700 include: model developer, model owner, LOB functional group, LOB manager, LOB model validator, LOB governance, model approver, corporate model risk (CMoR) model validator, model implementer, CMoR governance, regulator, group finance officer, and audit. Other embodiments can include more or fewer operations and roles.

Example model life cycle 700 begins by developing a model (operation 702). Developing a model (operation 702) includes the model management system 104 prompting the user to create or add model requirements and establish a model design. An example user at this stage is a QTM owner. Then the model management system 104 prompts for, receives, and stores data about the model, including various documents associated with the model and testing documents. Developing a model (operation 702) also includes constructing the model using the entered information, testing the model, and documenting the model.

After the model is developed (operation 702), the model is validated (operation 704). Here, the model management system 104 facilitates the review of documentation by one or more stakeholders by centrally housing, sorting, and displaying all documents related to the model on the model's home page 500. The model management system 104 also advantageously provides access to tracking tools for issues, exceptions, conditions, and restrictions.

During model validation, if the model is rejected, the workflow returns to model development (operation 702). If the model validation is approved, then the model management system 104 stores validation data in the model inventory, sends a request for governing body model approval, and generates a model mandate.

After the model is validated (operation 704) and approved for implementation through the workflow within the model management system 104, the model is implemented (operation 706). Model implementation (operation 706) includes the model management system 104 notifying, and receiving verification of completion from, one or more model stakeholders. These model stakeholders can, via the model management system, integrate and maintain source code for the particular model, perform various integration tests, and release the model.

After the model is implemented (operation 706), the model is used (operation 708). Model use includes the model management system 104 running the model and analyzing the output of the model. A stakeholder using the model management system 104 can determine, based on the model use, the usefulness of the model output and apply risk mitigation strategies where needed. The model output is used by various stakeholders and the model management system 104 provides ongoing performance monitoring.

Throughout the model use (operation 708), the model can be maintained (operation 710). The model management system 104 can prompt stakeholders to review the model on a regular basis, such as semi-annually or annually, and/or to review the model based on the model's current performance. The fact that models change and require validation and reviews creates a need for stakeholders to understand what is requested of them and when across an entire line of business, a model use type, or enterprise. The model management system 104 provides pipeline visibility for the various stakeholders/users about what needs to be reviewed and when. Thereby, the model management system 104 facilitates a process dictated by policy requirements and provides notice to stakeholders when a review is not complete and, thus, out of policy.

The model management system 104 enables stakeholders to change the model, test the changes, modify documents related to the model, approve the changes, log the changes, and implement the changes to the model.

At some point, the model is retired (operation 712). During model retirement (operation 712), the model management system 104 notifies the relevant stakeholders to approve the model for retirement. Upon receiving approval, the model management system 104 unplugs the model from the system and marks the model as retired. After retirement, the model is no longer active in the model management system 104, is not used in risk determinations, and does not appear in QTM searches for active models.

Figure 7:
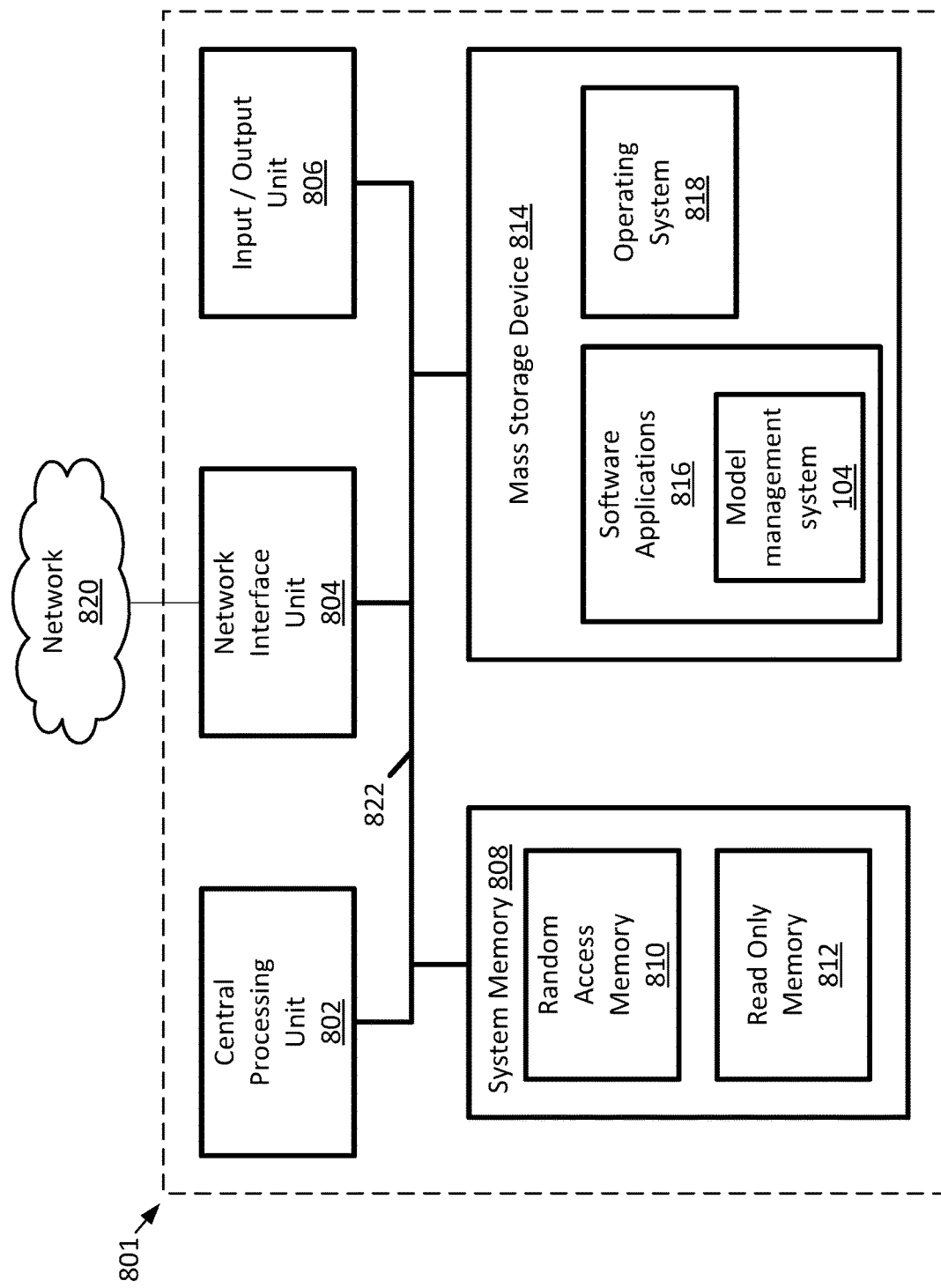
FIG. 7 shows example physical components of a computing device hosting the model management system of FIG. 1.

FIG. 7 shows an example server 801 hosting the model management system 104. As illustrated, the example server 801 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the example server 801, such as during startup, is stored in the ROM 812. The example server 801 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the example server 801. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example server 801.

According to various embodiments of the invention, the example server 801 may operate in a networked environment using logical connections to remote network devices through the network 820, such as a wireless network, the Internet, or another type of network. The example server 801 may connect to the network 820 through a network interface unit 804 connected to the system bus 822. It should be appreciated that the network interface unit 804 may also be utilized to connect to other types of networks and remote computing systems. The example server 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example server 801 can store software instructions and data. The software instructions include an operating system 818 suitable for controlling the operation of the example server 801. The mass storage device 814 and/or the RAM 810 also store software instructions, that when executed by the CPU 802, cause the example server 801 to provide the functionality of the example server 801 discussed in this document. For example, the mass storage device 814 and/or the RAM 810 can store software instructions that, when executed by the CPU 802, cause the example server 801 to display received data on the display screen of the example server 801.

Although various embodiments are described herein, those of ordinary skill in the art will understand that many modifications may be made thereto within the scope of the present disclosure. Accordingly, it is not intended that the scope of the disclosure in any way be limited by the examples provided.

The invention claimed is:

1. An electronic computing device comprising:
a processing unit; and
system memory, the system memory including instructions that, when executed by the processing unit, cause the electronic computing device to:
provide a first model in a suspended state;
receive an inventory of models, with each model in the inventory of models being in a live state and including: data regarding issues affecting an ability of the model to perform a function, a list of stakeholders for the model, a model history, and a document related to the model, wherein the inventory of models includes at least one model that is a quantitative mathematical or statistical construct for simulating events;
while the first model is in the suspended state:
provide a model risk home page at a graphical interface populated with data regarding the inventory of models, the model risk home page including selectable first buttons for selecting each of a plurality of the models;
determine a model risk score for each of the models based on the issues for each of the models;
receive an update as one or more of the issues are opened or closed;
update the model risk score after receiving the update;
generate a model home page at the graphical interface in response to selection of one of the selectable first buttons, the model home page including information associated with the selected model, the model home page including selectable second buttons for viewing a plurality of types of information associated with the selected model, the information including the list of stakeholders, the selectable second buttons including a model history link to access the selected model history, a document link to access the document related to the selected model, and a model risk score link to access the model risk score of the selected model; and
responsive to the model risk score link being selected:
receive a plurality of model risk score inputs including the issues of the selected model, wherein each of the issues has an issue score;
determine a highest issue score of the issue scores;
set a model risk base to a value equal to the highest issue score;
calculate a model risk increment based on an amount of the issues and a severity of the issues;
update the model risk score of the selected model based on the model risk base, the model risk increment, and a model risk adjustment of the model;
provide the model risk score for display at the graphical interface;
provide a user update prompt at the graphical interface;
receive a user update to one of the plurality of model risk score inputs over the user update prompt;
generate an updated model risk score based on the user update to one of the plurality of model risk score inputs; and
generate a first report of the models in the inventory of models that are in the live state, the first report including the updated model risk score of the selected model and the determined model risk scores of the other models in the inventory of models that are in the live state, the first model in the suspended state not being included in the first report;
receive a modification to the first model in the suspended state by each of a plurality of stakeholders simultaneously;
modify the first model in the suspended state based on the modifications;

release, subsequent to the modify, the modified first model causing the modified first model to change from the suspended state to a live state; and subsequent to the release, generate a second report, the second report including a risk score for the modified first model, the updated model risk score of the selected model, and the determined model risk scores of the other models in the inventory of models that are in the live state.

2. The electronic computing device of claim 1, wherein the data regarding the issues for each of the models further includes:

a severity assigned to each issue of the issues;

a designation of each issue of the issues as open or closed; and wherein the model risk score is based on the severity assigned to each issue of the issues having an open designation and the number of issues at each severity.

3. The electronic computing device of claim 1, wherein the system memory further includes instructions that, when executed by the processing unit, cause the electronic computing device to:

determine a first risk score for all live models in a line of business; and determine a second risk score for all live models in an enterprise.

4. The electronic computing device of claim 3, wherein each of the models is in a suspended state until a user publishes the model;

wherein one or more of the models in the suspended state are modifiable by one or more stakeholders;

wherein one or more of the models in the suspended state are unavailable for use in determination of the first risk score for all live models in the line of business; and wherein one or more of the models in the suspended state are unavailable for use in determination of the second risk score for all live models in the enterprise.

5. The electronic computing device of claim 1, wherein the system memory further includes instructions that, when executed by the processing unit, cause the electronic computing device to:

determine a performance rating for the selected model by:
using one or more key performance indicators; and
testing the one or more key performance indicators against the selected model; and provide a visual indication of the performance rating.

6. The electronic computing device of claim 1, wherein the system memory further includes instructions that, when executed by the processing unit, cause the electronic computing device to:

provide a notification to a stakeholder associated with the selected model when there is a change in an issue associated with the selected model.

7. The electronic computing device of claim 1, wherein the system memory further includes instructions that, when executed by the processing unit, cause the electronic computing device to:

generate an annual review report; and generate a validation report.

8. A model management system, comprising:

an electronic computing device comprising:
a processing unit; and
system memory, the system memory including instructions that, when executed by the processing unit, cause the electronic computing device to:
provide a first model in a suspended state;
provide a model risk home page at a graphical interface;
while the first model is in the suspended state:
populate the model risk home page with data regarding a plurality of models in a live state, the model risk home page including selectable first buttons for selecting each of the plurality of models, wherein the plurality of models includes at least one model that is a quantitative mathematical or statistical construct for simulating events;
receive an input from a selecting of one of the first buttons corresponding to a selected one of the plurality of models;
responsive to receiving the input, generate a model page at the graphical interface, the model page including selectable second buttons for viewing a plurality of types of information associated with the selected model, the selectable buttons including one or more document links to access one or more documents associated with the model and a model risk score link;
responsive to the second button corresponding to the model risk score link being selected:
receive a plurality of model risk score inputs including issues for the model affecting an ability of the model to perform a function, each of the issues having an issue score;
determine a highest issue score of the issue scores;
set a model risk base to a value equal to the highest issue score;
calculate the model risk increment based on an amount of the issues and a severity of the issues;
generate a model risk score based on the model risk base, the model risk increment, and a model risk adjustment of the selected model, wherein the model risk adjustment is based on the issues for the selected model;
provide the model risk score for display at the graphical interface;
provide a user update prompt at the graphical interface;
receive a user update to one of the plurality of model risk score inputs over the user update prompt; and
generate an updated model risk score based on the user update to one of the plurality of model risk score inputs;
receive a modification to the first model in the suspended state by each of a plurality of stakeholders simultaneously,
modify the first model in the suspended state based on the modifications;
release, subsequent to the modify, the first model causing the first model to change from the suspended state to a live state and causing a risk score of the first model to be accessible via the model page.

9. The model management system of claim 8, wherein each of the plurality of models is in a suspended state until a user publishes the model;

wherein one or more of the models in the suspended state can be modified by one or more stakeholders; and wherein, upon publication of one or more of the models in the suspended state, the model is available for search results and for a risk determination.

10. The model management system of claim 9, wherein the risk determination is a first risk score for all live models in a line of business or a second risk score for all live models in an enterprise.

11. The model management system of claim 8, wherein the plurality of model risk score inputs for each of the models further includes:
    a severity assigned to each issue of the issues;
    a designation of each issue of the issues as open or closed; and
    wherein the model risk score is based on the severity assigned to each issue having an open designation and the number of issues at each severity.

12. The model management system of claim 8,
    wherein the information for the selected model further includes a list of stakeholders for the model and a model history; and
    wherein the system memory further includes instructions that, when executed by the processing unit, cause the electronic computing device to:
        provide a notification to a stakeholder associated with the selected model when there is a change in one or more of the issues associated with the model.

13. The model management system of claim 8, wherein the system memory further includes instructions that, when executed by the processing unit, cause the electronic computing device to:
    determine a performance rating for the selected model by:
        using one or more key performance indicators; and
        testing the one or more key performance indicators against the selected model; and
    provide a visual indication of the performance rating.

14. The model management system of claim 8, wherein the system memory further includes instructions that, when executed by the processing unit, cause the electronic computing device to:
    generate an annual review report; and
    generate a validation report.

15. A system for managing models, comprising:
    a computer-readable, non-transitory data storage memory comprising instructions that, when executed by a processing unit of an electronic computing device, cause the processing unit to:
        provide a first model in a suspended state;
        receive an inventory of models, with each model in the inventory of models being in a live state and including: a list of stakeholders for the model, a model history, a document related to the model, and data regarding issues affecting an ability of the model to perform a function, wherein the inventory of models includes at least one model that is a quantitative mathematical or statistical construct for simulating events;
        while the first model is in the suspended state, for each of the models in the inventory:
            determine a highest issue score of issue scores of the issues of the model;
            set a model risk base to a value equal to the highest issue score;
            calculate a model risk increment based on an amount of the issues of the model and a severity of the issues; and
        determine a model risk score for the model based on the model risk base, the model risk increment, and a model risk adjustment of each of the models;
        receive an update as one or more of the issues are opened or closed;
        update the model risk score after receiving the update;
        provide a model risk home page at a graphical interface populated with data regarding the inventory of models, the model risk home page including selectable first buttons for selecting each of a plurality models of the inventory of models;
        generate a model home page at the graphical interface in response to selection of one of the selectable first buttons, the model home page including information associated with the selected model, the model home page including selectable second buttons for viewing a plurality of types of information associated with the selected model, the second buttons including a document link to access the document related to the selected model, and a button for viewing the model risk score of the selected model,
        wherein the data regarding the issues for each of the models further includes:
            a severity assigned to each issue of the issues;
            a designation of each issue of the issues as open or closed; and
        wherein the model risk score is based on the severity assigned to each issue having an open designation and the number of issues at each severity; and
        generate a first report of the models in the inventory of models that are in the live state, the first report including the model risk score of the selected model and the determined model risk scores of the other models in the inventory of models that are in the live state, the first model in the suspended state not being included in the first report;
        receive a modification to the first model in the suspended state by each of a plurality of stakeholders simultaneously;
        modify the first model in the suspended state based on the modifications;
        release, subsequent to the modify, the modified first model causing the modified first model to change from the suspended state to a live state; and
        subsequent to the release, generate a second report, the second report including a risk score for the modified first model, the model risk score of the selected model, and the determined model risk scores of the other models in the inventory of models that are in the live state.

16. The system for managing models of claim 15, wherein the computer-readable, non-transitory data storage memory further includes instructions that, when executed by the processing unit, cause the electronic computing device to:
    determine a first risk score for all live models in a line of business; and
    determine a second risk score for all live models in an enterprise,
    wherein each of the models is in a suspended state until a user publishes the model;
    wherein each of the suspended state models can be modified by one or more stakeholders;
    wherein each of the suspended state models are unavailable for use in determination of the first risk score for all live models in the line of business; and wherein each of the suspended state models are unavailable for use in determination of the second risk score for all live models in the enterprise.

17. The system for managing models of claim 16, wherein the computer-readable, non-transitory data storage memory further includes instructions that, when executed by the processing unit, cause the electronic computing device to:

determine a performance rating for the selected model by:
using one or more key performance indicators; and
testing the one or more key performance indicators against the selected model; and provide a visual indication of the performance rating.

18. The system for managing models of claim 17, wherein the computer-readable, non-transitory data storage memory further includes instructions that, when executed by the processing unit, cause the electronic computing device to:

provide a notification to a stakeholder associated with the selected model when there is a change in one or more of the issues associated with the selected model;
generate an annual review report; and
generate a validation report.

19. The electronic computing device of claim 5, wherein the inventory of models further includes:
a model for predicting credit losses to estimate exposure to credit risk based on existing or prospective extensions of credit; or
a model to simulate economic scenarios to determine sufficiency of capital reserves; and wherein the issues include:
an absence of consideration of certain data relevant to a model;
a misapplication of an equation or formula;
a change to an assumption on which a model is based;
an inaccuracy in an assumption on which a model is based;
a validation issue; or
a line of business evaluation issue.

20. The electronic computing device of claim 5, wherein the system memory further includes instructions that, when executed by the processing unit, cause the electronic computing device to:
create an issue for the selected model responsive to the performance rating indicating that an action is required.

* * * * *